US012060242B2

(12) United States Patent
Tateishi et al.

(10) Patent No.: US 12,060,242 B2
(45) Date of Patent: Aug. 13, 2024

(54) SHEET FEEDING DEVICE AND IMAGE FORMING APPARATUS

(71) Applicant: CANON KABUSHIKI KAISHA, Tokyo (JP)

(72) Inventors: Tomoya Tateishi, Kanagawa (JP); Jumpei Nitta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 17/497,769

(22) Filed: Oct. 8, 2021

(65) Prior Publication Data

US 2022/0127090 A1 Apr. 28, 2022

(30) Foreign Application Priority Data

Oct. 27, 2020 (JP) ................................ 2020-179312
Apr. 28, 2021 (JP) ................................ 2021-076248

(51) Int. Cl.
*B65H 3/06* (2006.01)
*G03G 15/00* (2006.01)

(52) U.S. Cl.
CPC ......... *B65H 3/0607* (2013.01); *B65H 3/0684* (2013.01); *G03G 15/6529* (2013.01)

(58) Field of Classification Search
CPC ........................ B65H 3/0684; B65H 2405/324
See application file for complete search history.

(56) References Cited

U.S. PATENT DOCUMENTS

| | | | | |
|---|---|---|---|---|
| 10,167,148 | B2 * | 1/2019 | Kuno | B65H 85/00 |
| 2012/0074636 | A1 * | 3/2012 | Choi | B65H 1/04 271/3.18 |
| 2017/0320686 | A1 * | 11/2017 | Taoka | B65H 3/0684 |
| 2020/0062520 | A1 * | 2/2020 | Shindou | B65H 3/68 |

FOREIGN PATENT DOCUMENTS

| | | | |
|---|---|---|---|
| JP | 2004131240 | A | 4/2004 |
| JP | 2015067392 | A | 4/2015 |
| JP | 2016222457 | A | 12/2016 |
| JP | 2017065887 | A | 4/2017 |

* cited by examiner

*Primary Examiner* — Howard J Sanders
(74) *Attorney, Agent, or Firm* — Canon U.S.A., Inc. IP Division

(57) ABSTRACT

A sheet feeding device includes a door movable between an opened position and a closed position relative to an apparatus body, a stacking portion for a sheet, a cover portion configured to be situated at a first position when the door is situated at the opened position and to be situated at a second position when the door is situated at the closed position, and a moving unit including a feeding roller and a moving member supporting the feeding roller. The moving member is movable with respect to the stacking portion in a first direction in which the feeding roller comes close to the stacking portion and in a second direction which is opposite to the first direction. In a state in which the cover portion is situated at the first position, the moving unit is situated between the cover portion and the door.

31 Claims, 10 Drawing Sheets

SHEET FEEDING DEVICE AND IMAGE FORMING APPARATUS

BACKGROUND

Field

Aspects of the present disclosure generally relate to a sheet feeding device, which feeds a sheet, and an image forming apparatus, which forms an image on a sheet.

Description of the Related Art

Some image forming apparatuses, such as printers, copying machines, and multifunction peripherals, include a sheet feeding device of the manual feed tray type (also called a multipurpose feeding device), which feeds a sheet serving as a recording material from a stacking tray mounted on the side surface of the apparatus body. Such a type of sheet feeding device has a configuration which, to cause a pickup roller (feeding roller) for picking up a sheet from the stacking tray to come into abutting contact with and move away from a sheet stacked on the stacking tray, moves an ascending and descending member for supporting the pickup roller. The ascending and descending member is urged downward in the movement directions by, for example, a spring to cause the pickup roller to come into abutting contact with a sheet at a predetermined pressing force, and is also controlled to ascend and descend by, for example, a cam mechanism.

Furthermore, the stacking tray of the manual feed tray type is mounted at an opening and closing unit which is able to open and close with respect to the side surface of the apparatus body and is configured to be stowed within the apparatus body by the opening and closing unit being closed when the stacking tray is not in use. On the other hand, for the pickup roller to stably come into abutting contact with and move away from a sheet by swinging movement of the ascending and descending member, the ascending and descending member is required to have a given length. Therefore, in the case of a configuration of the manual feed tray type, in a case where the opening and closing unit has been closed, the ascending and descending member, which has such a given length, and the pickup roller are to be stowed within the apparatus body.

Japanese Patent Application Laid-Open No. 2016-222457 discusses a configuration in which, when a tray is opened, an ascending and descending plate and a pickup roller are situated at a position projecting outside the side surface of the apparatus body and, in conjunction with an operation of closing the tray, the ascending and descending plate and the pickup roller are stowed on the side surface of the apparatus body. In this case, the operation of closing the tray causes the tray to come into abutting contact with and push up the pickup roller, and thus causes the ascending and descending plate and the pickup roller to move toward the apparatus body.

In the configuration discussed in Japanese Patent Application Laid-Open No. 2016-222457, in a state in which the tray is opened, the ascending and descending plate and the pickup roller are exposed on the outside of the apparatus body, so that the ascending and descending plate and the pickup roller are touchable from the outside.

SUMMARY

Aspects of the present disclosure are generally directed to preventing or reducing a feeding roller and a moving member from being touched from the outside.

According to an aspect of the present disclosure, a sheet feeding device includes a door openable and closable between an opened position and a closed position with respect to an apparatus body, a stacking portion on which to stack a sheet, a cover portion configured to face the door and move with respect to the apparatus body in conjunction with an opening and closing operation of the door, wherein the cover portion is situated at a first position when the door is situated at the opened position and is situated at a second position when the door is situated at the closed position, and a moving unit including (i) a feeding roller configured to feed the sheet and (ii) a moving member supporting the feeding roller, wherein the moving member is movable with respect to the stacking portion in a first direction in which the feeding roller comes close to the stacking portion and in a second direction which is opposite to the first direction, wherein, in a state in which the cover portion is situated at the first position, the moving unit is situated between the cover portion and the door, and wherein, when the cover portion moves from the second position to the first position, the cover portion pushes the moving unit in such a manner that the moving member moves in the first direction.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

Figure 1:
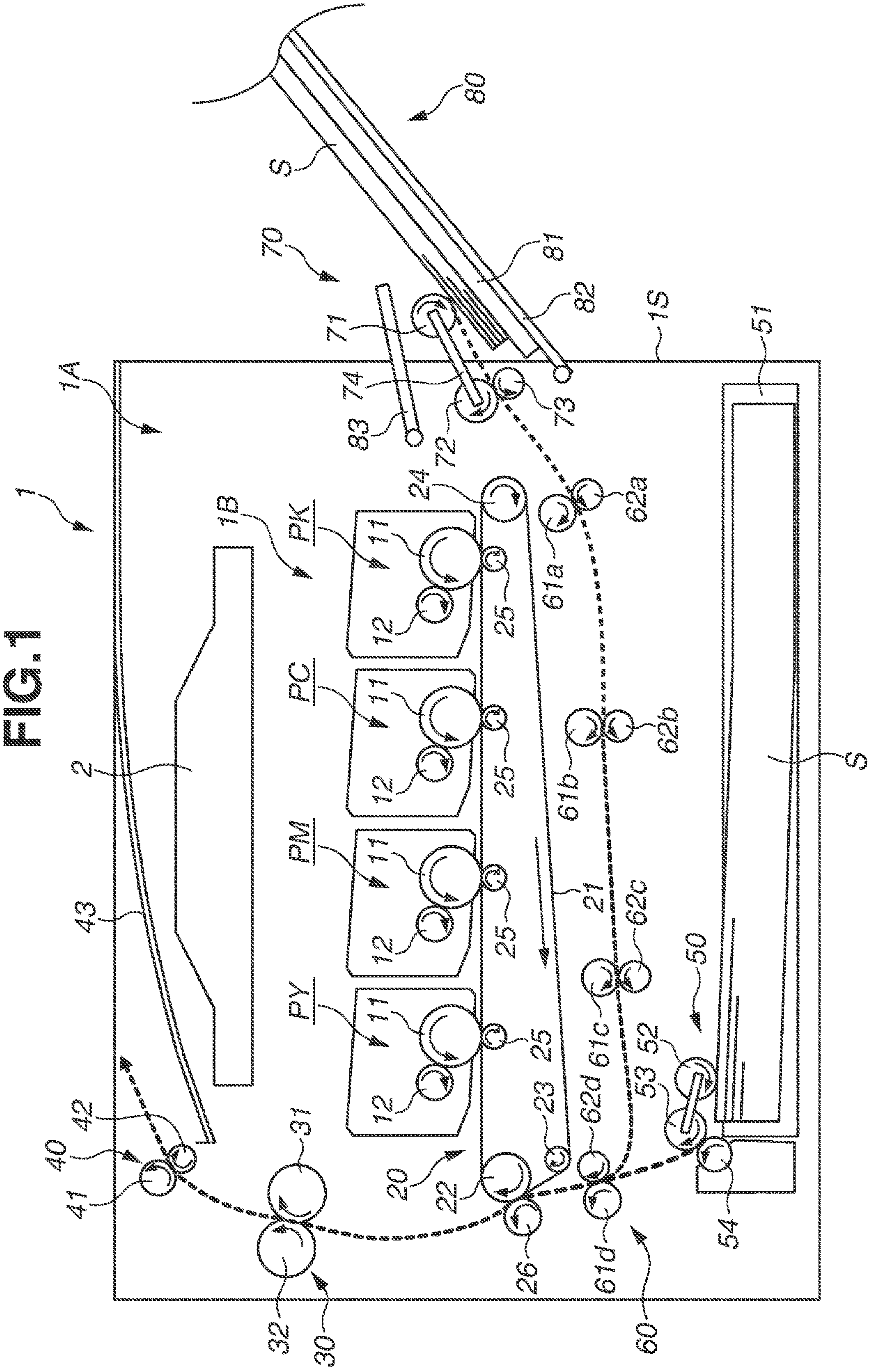
FIG. 1 is a schematic diagram of an image forming apparatus according to an exemplary embodiment of the present disclosure.

FIG. 1 is a schematic diagram of a laser beam printer, which is an image forming apparatus 1 according to an exemplary embodiment. In the following description, an overall configuration and function of the image forming apparatus 1 is described. Inside an apparatus body 1A of the image forming apparatus 1 (within the interior of the apparatus body 1A), an image forming unit 1B, in which four, first to fourth, process cartridges PY, PM, PC, and PK are arranged side by side in an approximately horizontal direction (an in-line configuration or a tandem type), is mounted as an image forming system. The process cartridges PY, PM, PC, and PK have mutually similar configurations although differing in the color of toner contained therein as a developer. In each of the process cartridges PY, PM, PC, and PK in the present exemplary embodiment, for example, a photosensitive drum 11, which serves as an image bearing member (electrophotographic photosensitive member), and a developing roller 12, which serves as a process unit acting on the photosensitive drum 11, are integrally incorporated in a cartridge. Each of the process cartridges PY, PM, PC, and PK is configured to be attachable to and detachable from the apparatus body 1A.

A laser scanner 2 is arranged above the process cartridges PY, PM, PC, and PK. An intermediate transfer belt unit 20 is arranged below the process cartridges PY, PM, PC, and PK. In the intermediate transfer belt unit 20, an intermediate transfer belt 21 serving as an intermediate transfer member is suspended in a tensioned manner by a driving roller 22, a driven roller 23, and a tension roller 24, and is configured to rotate clockwise as viewed in FIG. 1. In the photosensitive drum 11 of each of the process cartridges PY, PM, PC, and PK, the lower surface thereof is in contact with the upper surface of the intermediate transfer belt 21. Inside the intermediate transfer belt 21, four primary transfer roller 25 are arranged in such a way as to face the respective photosensitive drums 11 of the process cartridges PY, PM, PC, and PK. A secondary transfer roller 26 is in abutting contact with the driving roller 22 via the intermediate transfer belt 21. Inside an upper portion of the apparatus body 1A, a fixing device 30 and a discharge device 40 are arranged. A discharge tray 43 is arranged on the upper surface of the apparatus body 1A. The fixing device 30 includes a fixing film 31, which includes a heater substrate on the inner side thereof, and a pressure roller 32, which is in pressure contact with the heater substrate via the fixing film 31. The discharge device 40 includes a discharge roller 41 and a discharge wheel 42.

When the image forming apparatus 1 performs an image forming operation, the photosensitive drum 11 rotates and the surface of the photosensitive drum 11 is electrically charged in a homogeneous manner. The laser scanner 2 radiates laser light based on image information (print data) received from the outside to perform scanning exposure on the surface of the photosensitive drum 11, thus forming an electrostatic latent image on the photosensitive drum 11. The formed electrostatic latent image is made visible (developed) as a toner image by the developing roller 12.

The toner image formed on the photosensitive drum 11 is primarily transferred to the intermediate transfer belt 21 by the primary transfer roller 25. At this time, respective toner images formed on the process cartridges PY, PM, PC, and PK are transferred in a multiplexed manner in such a way as to overlap each other, so that a full-color toner image is formed on the intermediate transfer belt 21. The full-color toner image is borne on the intermediate transfer belt 21 and is then conveyed to a secondary transfer portion, which is a nip portion between the intermediate transfer belt 21 and the secondary transfer roller 26.

A sheet S serving as a recording material is fed from a sheet feeding device 50 or 70 toward the image forming unit 1B in parallel with the above-mentioned operation of the image forming unit 1B. The image forming apparatus 1 includes a sheet feeding device 50 of the stowage tray type and a sheet feeding device 70 of the manual feed tray type. Furthermore, examples of a sheet S to be used include various types of sheets different in size and material, for example, paper such as plain paper and heavy paper, plastic film, cloth, a sheet material subjected to surface treatment such as coated paper, and a specially shaped sheet material such as an envelope or index paper.

The sheet feeding device 50 of the stowage tray type includes a sheet S, which is stacked in a stowage tray 51 mounted to the apparatus body 1A in a drawable manner, and a feeding unit, which includes a pickup roller 52, a feed roller 53, and a separation roller 54. The pickup roller 52 rotates while coming into abutting contact with the uppermost sheet out of sheets S stacked in the stowage tray 51, and thus puts the uppermost sheet out in the leftward direction as viewed in FIG. 1. The feed roller 53 further conveys the sheet S received from the pickup roller 52. The separation roller 54 is in abutting contact with the feed roller 53 to form a separation nip, and applies frictional force to a sheet passing through the separation nip to separate a sheet S conveyed by the feed roller 53 from the other sheets S. Next, the front edge of the sheet S put out from the feed roller 53 collides with a nip portion between a conveyance roller 61*d* and a conveyance wheel 62*d* of a conveyance roller pair 60 (registration roller pair), which is in a stopped state, so that skewing of the sheet S is corrected.

The sheet feeding device 70 of the manual feed tray type is provided at the side portion (right side surface as viewed in FIG. 1) of the apparatus body 1A. Sheets S stacked on a stacking tray 81 of a door unit 80 are fed one by one. Details of the configuration of the sheet feeding device 70 are described below. A sheet S fed from the sheet feeding device 70 is conveyed toward the conveyance roller pair 60 by conveyance rollers 61*a*, 61*b*, 61*c*, and 61*d* and conveyance wheels 62*a*, 62*b*, 62*c*, and 62*d*. Then, the front edge of the sheet S collides with a nip portion of the conveyance roller pair 60, which is in a stopped state, so that skewing of the sheet S is corrected. An operation of the image forming apparatus 1 which is performed on the sheet S after the sheet S arrives at the nip portion of the conveyance roller pair 60 is similar to that performed in a case where a sheet S is fed from the sheet feeding device 50 of the stowage tray type.

After skewing of the sheet S is corrected, the conveyance roller pair 60 starts conveyance of the sheet S at timing synchronized with the operation of the image forming unit 1B, thus conveying the sheet S to a secondary transfer portion. In the secondary transfer portion, the toner image borne on the intermediate transfer belt 21 is secondarily transferred to the sheet S. The sheet S with the toner image transferred thereto is conveyed to the fixing device 30 and is then heated and pressed by a nip portion formed by the fixing film 31 and the pressure roller 32, so that the toner image is fixed to the sheet S. After that, the sheet S is discharged to outside the apparatus body 1A by the discharge roller 41 and the discharge wheel 42 and is then stacked on the discharge tray 43.

The above-mentioned image forming unit 1B is an example of an image forming system, and can also use an electrophotographic mechanism of the direct transfer type, which directly transfers a toner image formed on an image bearing member to a sheet. Moreover, not only an electrophotographic system but also a printing unit of the inkjet type or an offset printing mechanism can be used as an image forming system.

<Configuration and Operation of Sheet Feeding Device of the Manual Feed Tray Type>

Figure 2:
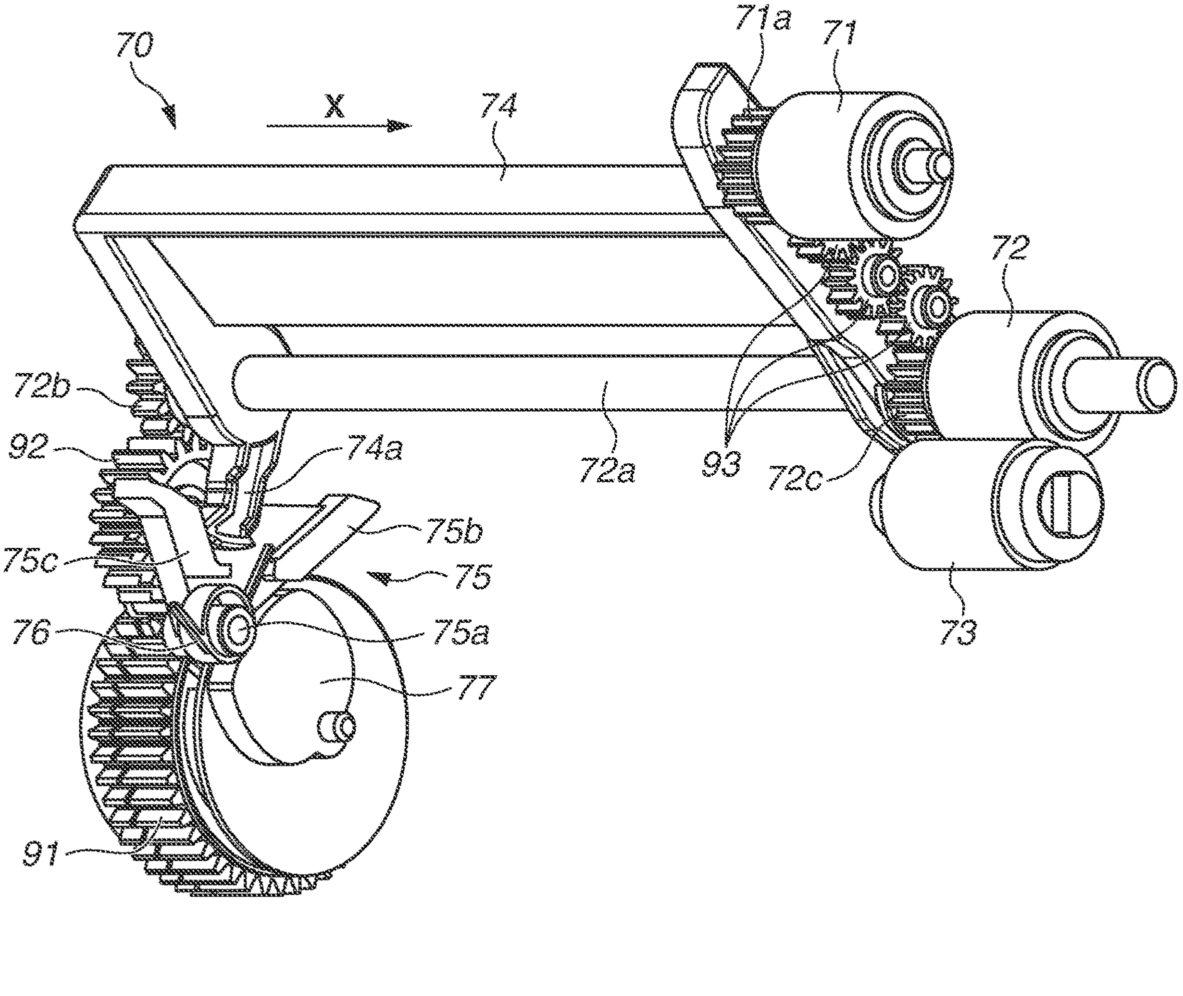
FIG. 2 is a perspective view illustrating a sheet feeding device according to the exemplary embodiment.

In the following description, a configuration and a feeding operation of a sheet feeding device (sheet conveyance device) 70 of the manual feed tray type in the present exemplary embodiment are described. FIG. 2 is a perspective view illustrating the sheet feeding device 70 and its surroundings. As illustrated in FIG. 1 and FIG. 2, the sheet feeding device 70 includes a stacking tray 81, which is supported by a door unit 80, and a feeding unit, which includes a pickup roller 71, a feed roller 72, a separation roller 73, and a swinging arm (an ascending and descending arm or a moving arm) 74. The door unit 80 is an opening and closing unit in the present exemplary embodiment, which is openable and closable between a fully-opened position and a stowed position (closed position) with respect to the apparatus body 1A, and the stacking tray 81 is a stacking portion in the present exemplary embodiment. The pickup roller 71 is a feeding roller in the present exemplary embodiment, and the swinging arm 74 is a swinging member (an ascending and descending member or a moving member) in the present exemplary embodiment. Furthermore, the apparatus body of the sheet feeding device refers to a housing which supports an opening and closing unit in such a way as to make the opening and closing unit openable and closable, and, in the present exemplary embodiment, the apparatus body 1A of the image forming apparatus 1 is an apparatus body of the sheet feeding device 70. Thus, the sheet feeding device 70 can be construed to include the apparatus body 1A.

The pickup roller 71 rotates while coming into abutting contact with the uppermost sheet out of the sheets S stacked on the stacking tray 81, thus putting out the sheet S in a sheet feeding direction (to the left as viewed in FIG. 1). The feed roller 72 further conveys the sheet S received from the pickup roller 71. The separation roller 73 is in abutting contact with the feed roller 72 to form a separation nip and applies frictional force to a sheet passing through the separation nip, thus separating the sheet S conveyed by the feed roller 72 from the other sheets S. After that, the sheet S is conveyed to the conveyance roller pair 60 as mentioned above, and is then supplied to the image forming unit 1B.

Furthermore, the above-mentioned separation roller 73 is, for example, a roller member connected via a torque limiter to a shaft fixed to the frame of the apparatus body 1A. Instead of this, a roller to which a driving force in a direction against the rotation of the feed roller 72 is input via a torque limiter can be used as a separation member. Moreover, a pad-like friction member can also be used as a separation member.

As illustrated in FIG. 2, a feed roller shaft 72*a*, which supports the feed roller 72, is supported to be rotatable by a bearing portion provided at the apparatus body 1A (FIG. 1). A roller shaft which supports the pickup roller 71 is supported to be rotatable by the swinging arm 74. The swinging arm 74 is provided to be swingable (movable or turnable) around the feed roller shaft 72*a* and is thus configured to cause the pickup roller 71 to ascend and descend with respect to the sheet S on the stacking tray 81. This makes the pickup roller 71 movable between a feeding position (lowered position) for coming into abutting contact with the sheet S and a separation position (raised position) for separating from the sheet S. Thus, the pickup roller 71 and the swinging arm 74 are movable with respect to the apparatus body 1A and the stacking tray 81. Specifically, in a state in which the stacking tray 81 is stopped at a predetermined position with respect to the apparatus body 1A, the pickup roller 71 and the swinging arm 74 move with respect to the stacking tray 81 and the apparatus body 1A. A portion including the swinging arm 74 and the pickup roller 71 is referred to as a "moving unit". Thus, the swinging arm 74 and the pickup roller 71 are parts of the moving unit.

In the following description, the position of the swinging arm 74 corresponding to the feeding position of the pickup roller 71 and the position of the swinging arm 74 corresponding to the separation position of the pickup roller 71 are described as the feeding position and the separation position of the swinging arm 74, respectively. Furthermore, the ascending and descending operation of the swinging arm 74 is controlled by an ascending and descending control mechanism described below.

<Roller Driving Configuration>

A driving configuration of the sheet feeding device 70 is described. As illustrated in FIG. 2, the sheet feeding device 70 includes a partially-toothless gear 91, which is rotated by a driving force supplied from a motor serving a drive source provided in the apparatus body 1A. Additionally, the sheet feeding device 70 includes an input gear 72*b*, an output gear 72*c*, and a pickup gear 71*a*, which rotates integrally with the pickup roller 71. The feed roller 72, the feed roller shaft 72*a*, the input gear 72*b*, and the output gear 72*c* are coaxially arranged and are configured to rotate integrally with each other. The partially-toothless gear 91 and the input gear 72*b* are coupled to each other via an idler gear 92. Moreover, the output gear 72*c* and the pickup gear 71*a* are coupled to each other via an idler gear 93. The idler gear 93 and the pickup gear 71*a* are supported by the swinging arm 74.

When the partially-toothless gear 91 rotates, the rotation thereof is transmitted to the input gear 72*b* via the idler gear 92, so that the output gear 72*c* and the feed roller 72 rotate. Additionally, the pickup gear 71*a*, which is arranged at the end portion of the pickup roller 71, rotates via the idler gear 93, which is coupled to the output gear 72*c* in a driven manner, so that the pickup roller 71 also rotates. Furthermore, the partially-toothless gear 91 is a gear unit composed of two spur gears each having a toothless portion overlaid on each other, and is configured to be controllable for rotation by an electromagnetic solenoid (not illustrated). The partially-toothless gear 91 is stopped by a regulation portion (not illustrated), which is moved by the electromagnetic solenoid, in a state in which the toothless portions have become opposed to a gear (not illustrated) which is rotated by the motor. One spur gear of the partially-toothless gear 91 is urged toward the gear (not illustrated) which is rotated by the motor. Each time a trigger is input to the electromagnetic solenoid, the regulation portion moves, so that a toothed portion of the urged spur gear meshes with the gear (not illustrated) which is rotated by the motor. In response to one spur gear rotating, the other spur gear rotates, so that a toothed portion of the other spur gear meshes with the gear (not illustrated) which is rotated by the motor. Then, the partially-toothless gear 91 makes one rotation, and, in response to the partially-toothless gear 91 rotating, the feed roller 72 and the pickup roller 71 rotate. The regulation portion regulates the partially-toothless gear 91 again in such a manner that the partially-toothless gear 91 is stopped after making one rotation.

<Ascending and Descending Control Mechanism>

Figure 3:
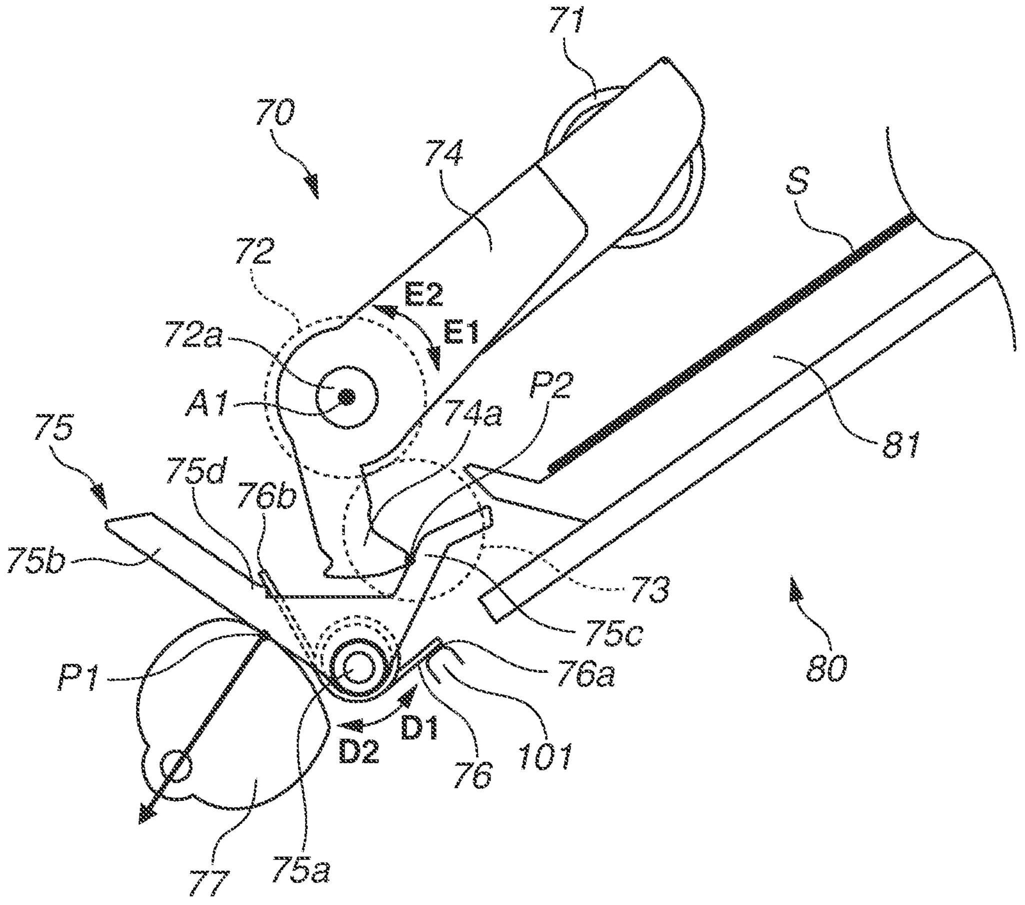
FIG. 3 is a diagram used to explain an operation of a swinging arm according to the exemplary embodiment.
Figure 4:
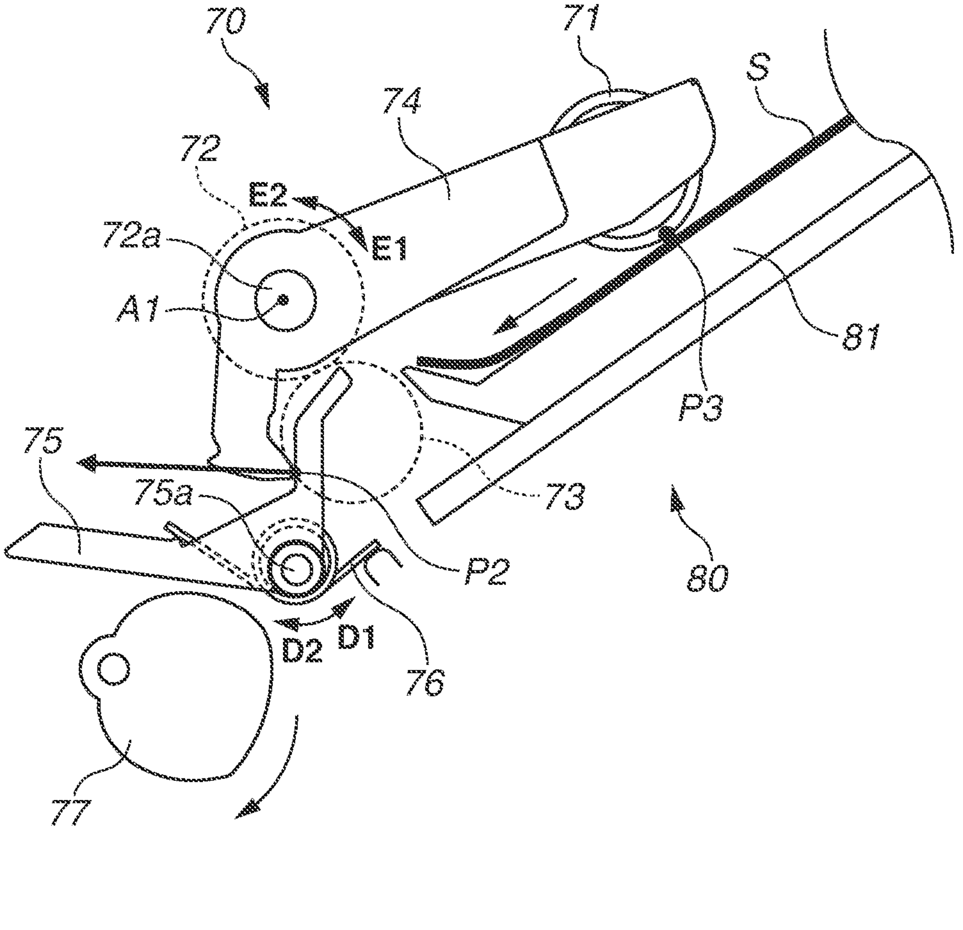
FIG. 4 is a diagram used to explain an operation of the swinging arm according to the exemplary embodiment.

Next, a configuration of the ascending and descending control mechanism, which causes the pickup roller 71 to ascend and descend, is described with reference to FIG. 2 to FIG. 4. FIG. 3 and FIG. 4 are schematic views illustrating a part of the sheet feeding device 70 as viewed in a rotational axis direction X (a nip width direction of the separation nip or a sheet width direction in FIG. 2) of the pickup roller 71. FIG. 3 shows a state in which the pickup roller 71 is in a separation position, and FIG. 4 shows a state in which the pickup roller 71 is in a feeding position.

As illustrated in FIG. 2, the sheet feeding device 70 includes a cam (regulation member) 77, a pressure spring 76, and a pressure lever 75, which serve as the ascending and descending control mechanism. The cam 77 is provided coaxially with the partially-toothless gear 91, and rotates together with the partially-toothless gear 91.

As illustrated in FIG. 2 and FIG. 3, the pressure lever 75, which serves as a transmission portion (transmission member) in the present exemplary embodiment), is supported by the apparatus body 1A and is able to turn around a shaft portion 75*a* approximately parallel to the feed roller shaft 72*a*. In other words, the pressure lever 75 is able to turn around an axis different from an axis A1 (the center of the feed roller shaft 72*a*), which is a swinging axis of the swinging arm 74, and substantially parallel to the axis A1. The pressure lever 75 includes a cam abutting contact portion 75*b*, which comes into abutting contact with a cam surface (outer circumferential surface) of the cam 77, and an arm abutting contact portion 75*c*, which comes into abutting contact with a projection portion 74*a* serving as an abutting contacted portion of the swinging arm 74. The pressure lever 75 is configured to be swingable (movable) in a direction D1 and a direction D2 illustrated in FIG. 3. The cam 77 is configured to be movable between a regulation position, at which the cam 77 comes into abutting contact with the cam abutting contact portion 75*b* of the pressure lever 75 to regulate the position of the pressure lever 75 urged by the pressure spring 76, and a release position, to which the cam 77 retreats from the regulation position. In the present exemplary embodiment, when the cam 77 is at the release position, the cam 77 moves away from the cam abutting contact portion 75*b* of the pressure lever 75.

Furthermore, the arm abutting contact portion 75*c* of the pressure lever 75 has a first surface C1 and a second surface C2 (see FIG. 6), each of which is able to come into abutting contact with the projection portion 74*a* of the swinging arm 74. Actions of the first surface C1 and the second surfaced C2 are described below.

The pressure spring 76, which is an urging portion (urging member) in the present exemplary embodiment, has the function of urging the swinging arm 74 toward the feeding position via the pressure lever 75 by urging the pressure lever 75 in a predetermined turning direction. In the present exemplary embodiment, a torsion coil spring mounted around the shaft portion 75*a* of the pressure lever 75 is used as the pressure spring 76. One end portion 76*a* of the pressure spring 76 is attached to a spring hanging portion 101, and the other end portion 76*b* thereof is attached to a spring hanging portion 75*d* of the pressure lever 75. The pressure spring 76 generates a force which acts to rotate the pressure lever 75 in the direction D1 (counterclockwise as viewed in FIG. 3). The pressure spring 76 generates a force which acts to rotate the pressure lever 75 in a direction in which the cam abutting contact portion 75*b* of the pressure lever 75 comes close to the cam 77.

Hereinafter, out of swinging directions of the swinging arm 74, a swinging direction (first direction) for use in causing the pickup roller 71 to move from the separation position to the feeding position (descend) is referred to as a direction E1. Moreover, a swinging direction (second direction opposite to the first direction) for use in causing the pickup roller 71 to move from the feeding position to the separation position (ascend) is referred to as a direction E2. In other words, the direction E1 is a direction in which the pickup roller 71 comes close to the stacking tray 81. The direction E2 is a direction in which the pickup roller 71 moves away (recedes) from the stacking tray 81.

Before the start of a sheet feeding operation, the door unit 80 is in the fully-opened position, and the cam 77 is situated in the regulation position. As illustrated in FIG. 3, before the start of a sheet feeding operation, the pickup roller 71 is held at the separation position and is thus away upward from the stacking tray 81 and the sheet S. In this state, the cam 77 and the pressure lever 75 come into abutting contact with each other at a point P1 and the pressure lever 75 and the swinging arm 74 come into abutting contact with each other at a point P2, so that the position of the swinging arm 74 is held. Thus, the pressure lever 75, which is urged by the pressure spring 76 in the direction D1, is received and stopped by the cam 77 coming into abutting contact with the cam abutting contact portion 75*b* of the pressure lever 75 at the point P1, so that the pressure lever 75 is held. Moreover, the swinging arm 74 is urged in the direction E2 by a swinging arm urging spring (a self-weight cancel spring) (not illustrated). In this state, the projection portion 74*a* of the swinging arm 74 comes into abutting contact with the arm abutting contact portion 75*c* of the pressure lever 75 (the first surface C1 in FIG. 6), so that the swinging arm 74 is positioned at the separation position.

Furthermore, the force of the swinging arum urging spring is set to a value slightly larger than a force with which the swinging arm 74 will turn in the direction E1 by the weight of the swinging arm 74 itself and the weight of a member supported by the swinging arm 74. The moment of a force in the direction E2 which acts on the swinging arm 74 by the swinging arm urging spring is sufficiently smaller than the maximum value of the moment of a force in the direction E1 which can act on the swinging arm 74 by the pressure spring 76. Therefore, the pressure lever 75 does not turn in the direction D2 from the position illustrated in FIG. 3 and holds the swinging arm 74 at the position illustrated in FIG. 3 against the urging force of the swinging arm urging spring in the state of being in abutting contact with the cam 77 at the point P1. Since, in this way, the pickup roller 71 is held at the separation position, the user is enabled to readily set the sheet S on the stacking tray 81.

When the sheet S is fed, the door unit 80 is in the fully-opened position, the cam 77 is situated at the release position, and the cam 77 moves away from the pressure lever 75. In this state, the pressure lever 75 urges the swinging arm 74 in such a way as to cause the swinging arm 74 to turn in the direction E1. As illustrated in FIG. 4, when a sheet feeding operation is started, the pickup roller 71 moves from the separation position to the feeding position and comes into abutting contact with the sheet S on the stacking tray 81. Thus, at the time of start of a sheet feeding operation, as mentioned above, a trigger is input to the electromagnetic solenoid, so that the partially-toothless gear 91 (FIG. 2) starts rotating. Then, the cam 77 rotates clockwise as viewed in FIG. 4 together with the partially-toothless gear 91, so that the cam surface of the cam 77 retreats from the cam abutting contact portion 75*b* of the pressure lever 75. Then, the pressure lever 75 turns in the direction D1 (counterclockwise as viewed in FIG. 4) by the urging force of the pressure spring 76. In conjunction with turning of the pressure lever 75 in the direction D1, the projection portion 74*a* of the swinging arm 74 is pressed by the arm abutting contact portion 75*c* (the first surface C1 in FIG. 6), so that the swinging arm 74 swings in the direction E1. Then, when the pickup roller 71 comes into abutting contact with the sheet S, the swinging of the swinging arm 74 in the direction E1 stops. The cam surface of the cam 77 moves away from the pressure lever 75 in the course of the swinging arm 74 swinging in the direction E1.

As illustrated in FIG. 4, in a state in which the pickup roller 71 is in abutting contact with the sheet S, the pressure lever 75 is urged in the direction D1 by the urging force of the pressure spring 76, so that the arm abutting contact portion 75*c* (first surface C1) of the pressure lever 75 comes into contact with the projection portion 74*a* of the swinging arm 74 at the point P2. Such a force with which the pressure lever 75 presses the swinging arm 74 causes the swinging arm 74 to be urged in the direction E1, so that a pressing force with which the pickup roller 71 comes into abutting contact with the sheet S at a point P3 is generated. In other words, the urging force of the pressure spring 76 serving as an urging portion is transmitted to the swinging arm 74 serving as an ascending and descending member via the pressure lever 75 serving as a transmission portion, so that an appropriate feeding pressure of the pickup roller 71 (feeding roller) is attained. Furthermore, as mentioned above, the moment in the direction E2 which acts on the swinging arm 74 by the swinging arm urging spring is smaller than the moment in the direction E1 which acts on the swinging arm 74 by the pressure spring 76. The urging force of the pressure spring 76 is set in such a manner that the pickup roller 71 is able to come into abutting contact with the sheet S with an appropriate pressure against the urging force of the swinging arm urging spring.

In parallel with the movement of the pickup roller 71 to the feeding position, the pickup roller 71 and the feed roller 72 rotate by the driving transmission effected via the above-mentioned gear train, so that one sheet S is fed from the stacking tray 81. After that, the cam 77 comes into contact with the pressure lever 75 again, so that the pressure lever 75 turns in the direction D2. The swinging arm 74 swings in the direction E2 by the swinging arm urging spring, so that the pickup roller 71 returns from the feeding position to the separation position. Then, when the cam 77 completes rotating, the sheet feeding device 70 returns to the state illustrated in FIG. 3.

<Door Unit>

Figure 5:
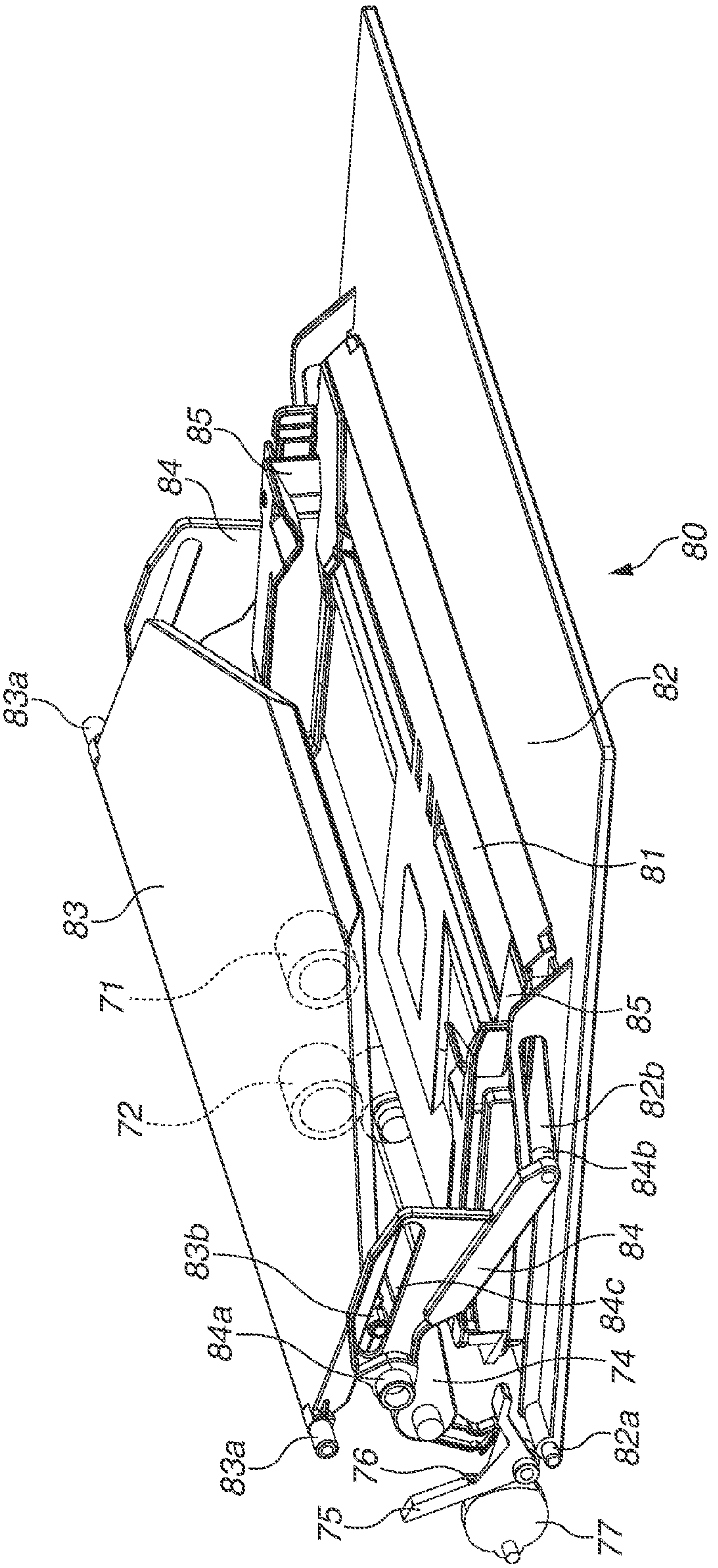
FIG. 5 is a perspective view illustrating portions near a door unit and the swinging arm according to the exemplary embodiment.

In the following description, an opening and closing operation of the door unit 80 and an operation of the swinging arm 74, which operates in conjunction with the opening and closing operation, in the present exemplary embodiment are described with reference to FIG. 5 to FIG. 9. FIG. 5 is a perspective view illustrating portions near the door unit 80 and the swinging arm 74.

The door unit 80 serving as an opening and closing unit in the present exemplary embodiment includes a stacking tray 81, a door member (door) 82, a cover member (cover portion) 83, and a door link 84. The stacking tray 81 is configured to move together with the door member 82, so that the stacking tray 81 also moves with respect to the apparatus body 1A in conjunction with the opening and closing operation of the door member 82. In the present exemplary embodiment, the stacking tray 81 includes a width regulation member 85, which regulates the position of the sheet S in the sheet width direction, and is supported by the door member 82. The door member 82 turns around a pivot point 82*a* supported by the apparatus body 1A (FIG. 1). The turning axis of the door member 82 is substantially parallel to the swinging axis of the swinging arm 74. The turning shaft of the door member 82 is referred to as a "first shaft". The door member 82 swings around the first shaft with respect to the apparatus body 1A. The movement direction of the width regulation member 85 is substantially parallel to the turning axis of the door member 82.

As described below, the stacking tray 81 has a function operating as a displacement unit which causes the swinging arm 74 of the movement unit to move in the direction E2 at the time of closing the door unit 80 (at the time of closing the door member 82). The cover member 83 has a function operating as a displacement unit which causes the swinging arm 74 of the movement unit to move in the direction E1 at the time of opening the door unit 80 (at the time of opening the door member 82). With regard to the movement direction of the door unit 80 (the movement direction of the door member 82) at the time of closing the door unit 80 (at the time of closing the door member 82), the stacking tray 81 is situated on the upstream side of the pickup roller 71. Moreover, with regard to the direction E2, the stacking tray 81 is situated on the upstream side of the pickup roller 71. With regard to the movement direction of the door unit 80 (the movement direction of the door member 82) at the time of opening the door unit 80 (at the time of opening the door member 82), the cover member 83 is situated on the upstream side of the pickup roller 71. Moreover, with regard to the direction E1, the cover member 83 is situated on the upstream side of the pickup roller 71.

In a state in which the door unit 80 has been opened to a predetermined fully-opened position as illustrated in FIG. 1, the stacking tray 81, the door member 82, and the cover member 83 project outward with respect to a side surface 1S of the apparatus body 1A. Additionally, in a state in which the door unit 80 has been opened to the predetermined fully-opened position, the swinging arm 74 and the pickup roller 71 project outward with respect to the side surface 1S of the apparatus body 1A. In a state in which the door unit 80 is in the fully-opened position, the stacking tray 81 is exposed outside, so that the sheet S is allowed to be stacked on the stacking tray 81. In this state, the sheet feeding device 70 is able to feed the sheet S from the stacking tray 81. On the other hand, when the door unit 80 has been moved to the stowed position, for example, the stacking tray 81, the cover member 83, and the pickup roller 71 are stowed inside the apparatus body 1A (in a space formed between the door member 82 and the apparatus body 1A). Thus, in a state in which the door unit 80 is in the stowed position, the stacking tray 81 is stowed in between the door member 82 (a part of the door unit 80) and the apparatus body 1A. The stowed position of the door unit 80 is a position in which the door member 82 has turned counterclockwise as viewed in FIG. 1 from the fully-opened position illustrated in FIG. 1. In the present exemplary embodiment, when the door unit 80 is in the stowed position, the outside surface of the door member 82 (the lower right side surface in FIG. 1) forms the side surface of the image forming apparatus 1 in conjunction with the side surface 1S of the apparatus body 1A. Additionally, in the present exemplary embodiment, when the door unit 80 is in the stowed position, the outside surface of the door member 82 is in a state of being parallel to the side surface 1S of the apparatus body 1A.

The position of the door member 82 taken when the door unit 80 is in the stowed position is referred to as a "closed position of the door member 82", and the position of the door member 82 taken when the door unit 80 is in the fully-opened position is referred to as a "opened position of the door member 82". The door member 82 is openable and closable between the opened position and the closed position with respect to the apparatus body 1A. In the present exemplary embodiment, when the door unit 80 is in the stowed position and the door member 82 is in the closed position, the outside surface of the door member 82 is situated on the same plane as the side surface 1S of the apparatus body 1A. As is understandable from FIG. 1, when the door unit 80 is in the fully-opened position, at least a part of the cover member 83, at least a part of the swinging arm 74, and the pickup roller 71 are situated outside the apparatus body 1A with respect to the closed position of the door member 82.

As illustrated in FIG. 5, the cover member 83 is arranged to cover at least a part (preferably, the whole) of the pickup roller 71 and the swinging arm 74 as viewed from the upper side in the direction of gravitational force. The cover member 83 turns around a pivot point 83*a* supported by the apparatus body 1A. The cover member 83 faces the door member 82. The turning shaft of the cover member 83 is referred to as a "second shaft". The cover member 83 swings around the second shaft with respect to the apparatus body 1A. The first shaft of the door member 82 and the second shaft of the cover member 83 are distantly positioned. The first shaft of the door member 82 and the second shaft of the cover member 83 are parallel to each other.

With regard to the turning axis direction of the cover member 83, the pickup roller 71 is arranged at the middle portion thereof. With regard to a direction perpendicular to the turning axis direction of the cover member 83, the cover member 83 includes a base portion and a fore-end portion opposite to the base portion, and the pivot point 83*a* is located at the base portion. With regard to lengths from the base portion to the fore-end portion of the cover member 83, the length at each of both end portions as viewed in the turning axis direction of the cover member 83 is shorter than the length at the middle portion as viewed in the turning axis direction of the cover member 83. The cover member 83 is configured to surely cover the pickup roller 71 at the middle portion and to make the sheet S easily viewable at both end portions.

The door link 84 includes a linkage shaft 84*b* and a guide groove 84*c*, and interlinks the door member 82 and the cover member 83. Specifically, the linkage shaft 84*b* and a guide groove 82*b* of the door member 82 engage with each other, and the guide groove 84*c* and a linkage shaft 83*b* of the cover member 83 engage with each other. Moreover, the door link 84 turns around a pivot point 84*a* supported by the apparatus body 1A. When the door member 82 turns, while the linkage shaft 84*b* slides inside the guide groove 82*b*, the door link 84 turns in conjunction with the door member 82. Moreover, in cooperation with turning of the door link 84, while the linkage shaft 83*b* slides inside the guide groove 82*b*, the cover member 83 turns in conjunction with the door link 84. In other words, the cover member 83 turns in conjunction with the door member 82. Thus, the door link 84 functions as a link member which causes the cover member 83 to move in conjunction with the door member 82. More specifically, the cover member 83 moves with respect to the apparatus body 1A in conjunction with an opening and closing operation of the door member 82. When the door unit 80 is situated in the fully-opened position, the door member 82 is situated in the opened position, and, when the door member 82 is situated in the opened position, the cover member 83 is situated in the first position. When the door unit 80 is situated in the stowed position, the door member 82 is situated in the closed position, and, when the door member 82 is situated in the stowed position, the cover member 83 is situated in the second position.

Furthermore, while some parts are not illustrated in the perspective view of FIG. 5, for example, the door link 84 and the pivot points 82*a* and 83*a* are provided at both sides in the sheet width direction. Moreover, in FIG. 6 to FIG. 8 for use in the following description, the width regulation member 85 is omitted from illustration.

<Operation in Stowing Door Unit>

In the following description, an operation in stowing the door unit 80 is described with reference to FIG. 6 to FIG. 8.

Figure 6:
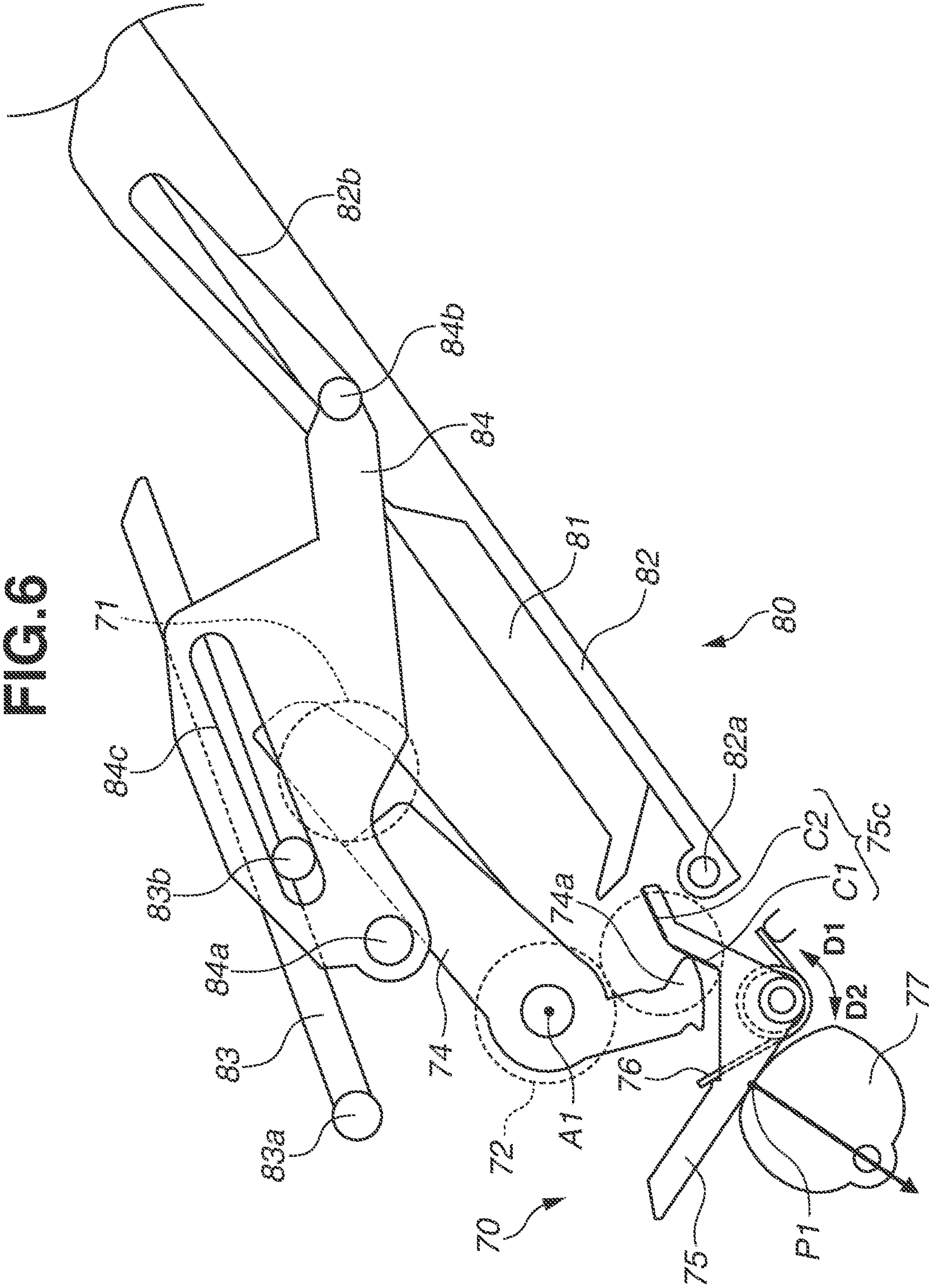
FIG. 6 is a diagram illustrating a state in which the door unit according to the exemplary embodiment is at an opened position.
Figure 7:
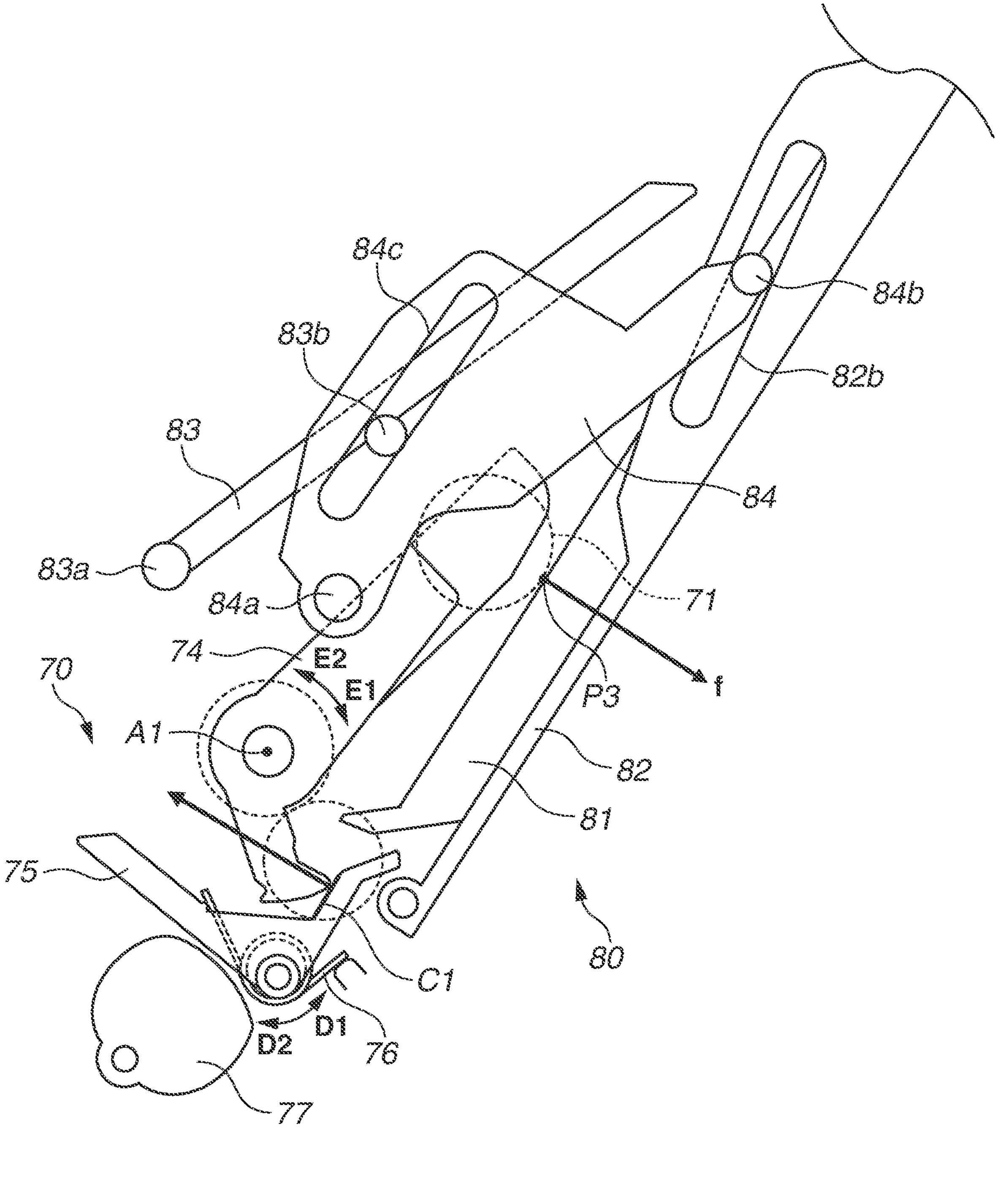
FIG. 7 is a diagram illustrating a state in which the door unit according to the exemplary embodiment is on the way moving from the opened position to a stowed position.
Figure 8:
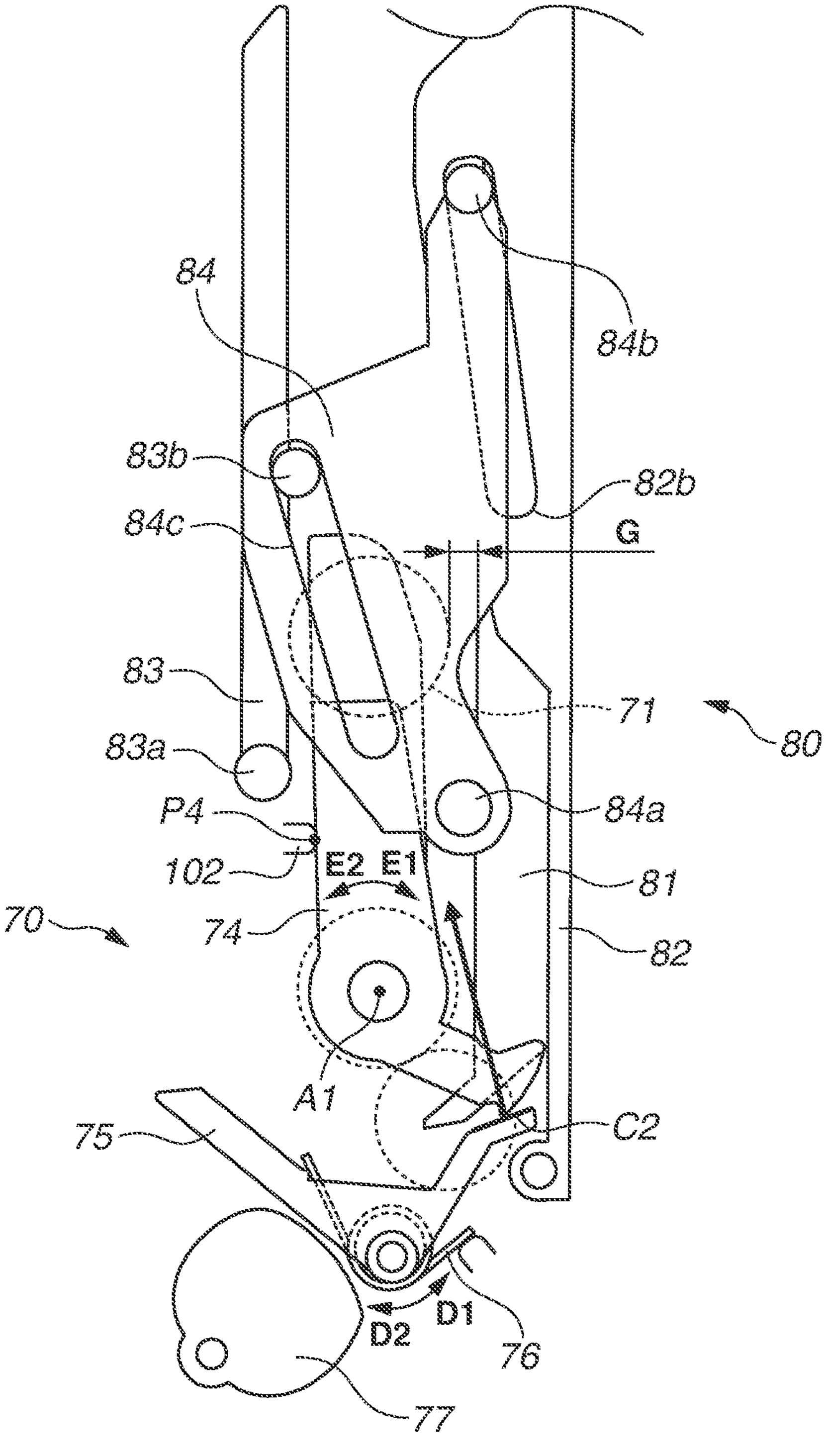
FIG. 8 is a diagram illustrating a state in which the door unit according to the exemplary embodiment is at the stowed position.

FIG. 6 to FIG. 8 are side views illustrating the sheet feeding device 70 as viewed in the sheet width direction (the rotational axis direction X of the pickup roller 71). FIG. 6 represents a state in which the door unit 80 is in the fully-opened position. As mentioned above, in a case where a sheet feeding operation is not being performed, the pickup roller 71 is in the separation position, and the urging force of the pressure spring 76 is received and stopped by the cam 77 at the point P1. When the user grasps the door member 82 and pushes up the door unit 80, the door member 82 turns upward around the pivot point 82*a*, so that the stacking tray 81 comes close to the pickup roller 71.

As illustrated in FIG. 6, in a state in which the door unit 80 is in the fully-opened position, the door member 82 is in the opened position and the cover member 83 is in the first position. At this time, at least a part (preferably, the whole) of the moving unit is situated in between the door member 82 and the cover member 83. Moreover, as viewed along the vertical direction (parallel to the direction of gravitational force), the cover member 83 situated in the first position and the pickup roller 71 overlap each other. Furthermore, it is favorable that, in the moving unit, the pickup roller 71 is arranged in between the door member 82 and the cover member 83. The cover member 83 enables preventing or reducing the moving unit from being touched from the outside.

The door unit 80 is configured to, when moving from the fully-opened position to the stowed position, push the pickup roller 71 of the moving unit against the urging force of the pressure lever 75 in such a manner that the swinging arm 74 swings in the direction E2. FIG. 7 illustrates a state in which, as the user further pushes up the door unit 80, the pickup roller 71 and the stacking tray 81 come into contact with each other at the point P3 and the swinging arm 74 starts to swing upward from the separation position. In this state, the door unit 80 is at a position between the fully-opened position and the stowed position, and the pickup roller 71 of the moving unit is in abutting contact with the door unit 80. Then, the pressure lever 75 is urging the swinging arm 74 in the direction E1. In response to the pickup roller 71 being pushed by the door unit 80, the swinging arm 74 turns in the direction E2. The swinging arm 74 comes into contact with the first surface C1 of the arm abutting contact portion 75*c* of the pressure lever 75 and thus turns the pressure lever 75 in the direction D2. Then, the pressure lever 75 moves away from the cam 77, and the urging force (see FIG. 6) of the pressure spring 76 which the cam 77 has received until then acts on the swinging arm 74 as a force which resists turning in the direction E2 of the swinging arm 74 via the first surface C1. In other words, the swinging arm 74 receives the urging force of the pressure spring 76 as a force which resists turning in the direction E2 of the swinging arm 74 (a force which urges the swinging arm 74 in the direction E1) via the first surface C1 of the pressure lever 75. Furthermore, the door unit 80 can be configured to push a component other than the pickup roller 71, such as the swinging arm 74.

In response to the swinging arm 74 being urged in the direction E1 by the urging force of the pressure spring 76, the pickup roller 71 supported by the swinging arm 74 pushes back the stacking tray 81 at the point P3 in a direction opposite to the raising direction of the door unit 80. Thus, in the process of an operation for stowing the door unit 80, the urging force of the pressure spring 76 is applied to the door unit 80 as a force f which presses the door unit 80 in a direction to fully open the door unit 80, via the pressure lever 75, the swinging arm 74, and the pickup roller 71.

FIG. 8 illustrates a state in which the door unit 80 has moved to the stowed position. In a state in which the door unit 80 is in the stowed position, the pickup roller 71 and the swinging arm 74 of the moving unit are situated away from the door unit 80. During a period until the door unit 80 arrives at the stowed position from the state illustrated in FIG. 7, the position at which the pressure lever 75 comes into contact with the swinging arm 74 changes from the first surface C1 to the second surface C2. The second surface C2 is formed in such a manner that the swinging arm 74 is urged in the direction E2 by the urging force of the pressure spring 76, which is transmitted to the swinging arm 74 via the second surface C2. When the swinging arm 74 is urged in the direction E2, the swinging arm 74 comes into abutting contact with the cover member 83, so that the door unit 80 is urged toward the stowed position. Until the swinging arm 74 comes into abutting contact with a stopper 102 described below, the swinging arm 74 urges the cover member 83. In a state in which the door unit 80 is in the stowed position, the swinging arm 74 receives the urging force of the pressure spring 76, as a force which urges the swinging arm 74 in the direction E2, via the second surface C2 of the pressure lever 75.

Here, in a state viewed in the direction of the swinging axis of the swinging arm 74, the second surface C2 extends at an angle different from that of the first surface C1. The direction of the urging force of the pressure spring 76 which acts on the swinging arm 74 changing in association with the stowing operation of the door unit 80 can be phrased as follows. Thus, as viewed in the direction of the axis A1, which is the swinging axis of the swinging arm 74, a normal vector of the first surface C1, which is in abutting contact with the swinging arm 74 in the state illustrated in FIG. 7 on the way of the stowing operation, passes through one side of the axis A1. Moreover, a normal vector of the second surface C2, which comes into abutting contact with the swinging arm 74 in the state illustrated in FIG. 8, in which the door unit 80 has arrived at the stowed position, passes through the other side of the axis A1. In a state in which the swinging arm 74 has come into abutting contact with the first surface C1, the swinging arm 74 is urged in the direction E1 by the pressure lever 75. In a state in which the swinging arm 74 has come into abutting contact with the second surface C2, the swinging arm 74 is urged in the direction E2 by the pressure lever 75.

In this way, in response to the contact position between the swinging arm 74 and the pressure lever 75 changing in conjunction with the stowing operation of the door unit 80, the direction in which the urging force of the pressure spring 76 acts on the swinging axis of the swinging arm 74 changes. As a result, in the process of the stowing operation of the door unit 80, the door unit 80 receives the force f (FIG. 7) from the swinging arm 74 via the pickup roller 71. On the other hand, in a state in which the door unit 80 is in the stowed position (FIG. 8), the pickup roller 71 is away from the door unit 80, so that the door unit 80 never receives a force in a direction to fully open the door unit 80 from the swinging arm 74. Thus, a force which the door unit 80 receives from the moving unit in a state in which the door unit 80 is in the stowed position is smaller than the maximum value of the force f which the door unit 80 receives from the moving unit in the process of the stowing operation of the door unit 80.

Furthermore, in a state in which the door unit 80 is in the stowed position, the pickup roller 71 moves away from the stacking tray 81. Moreover, in a state in which the door unit 80 is in the stowed position, the pickup roller 71 and the swinging arm 74 are away from the cover member 83. Furthermore, in a state in which the door unit 80 is in the stowed position, the moving unit can be in abutting contact with the cover member 83. The apparatus body 1A is provided with the stopper 102, which regulates turning of the swinging arm 74 in the direction E2. In a state in which the door unit 80 is in the stowed position, the swinging arm 74 comes into abutting contact with the stopper 102 at a point P4, so that the swinging arm 74 is positioned in a state in which a gap G has been formed between the pickup roller 71 and the stacking tray 81. Thus, in a state in which the door unit 80 is in the stowed position, the urging force of the pressure spring 76 is received and stopped by the stopper 102 provided in the apparatus body 1A. The swinging arm 74 being received and stopped by the stopper 102 enables causing the urging force of the swinging arm 74 to act on the stopper 102 and not to act on the cover member 83.

As illustrated in FIG. 8, in a state in which the door unit 80 is in the stowed position, the door member 82 being in the stowed position and the cover member 83 being in the second position are approximately parallel to the vertical direction. At this time, a part of the swinging arm 74 and the pickup roller 71 are situated in between the cover member 83 and the door member 82. On the other hand, as illustrated in FIG. 6, in a state in which the door unit 80 is the fully-opened position, the door member 82 being in the opened position and the cover member 83 being in the first position are inclined with respect to the vertical direction and the horizontal direction. In this state, the fore-end portion of the door member 82 is higher in position than the base portion thereof and the fore-end portion of the cover member 83 is higher in position than the base portion thereof. Moreover, the cover member 83 is arranged to cover at least a part of the stacking tray 81.

In the present exemplary embodiment, the angle at which the cover member 83 moves from the second position to the first position is larger than the angle at which the door member 82 moves from the closed position to the opened position. As a result, the distance between the fore-end portion of the cover member 83 and the door member 82 is shorter than the distance between the base portion of the cover member 83 and the door member 82. Accordingly, it is possible to more surely prevent or reduce the moving unit from being touched from the outside when the door unit 80 is in the fully-opened position.

<Operation in Fully Opening Door Unit>

Figure 9:
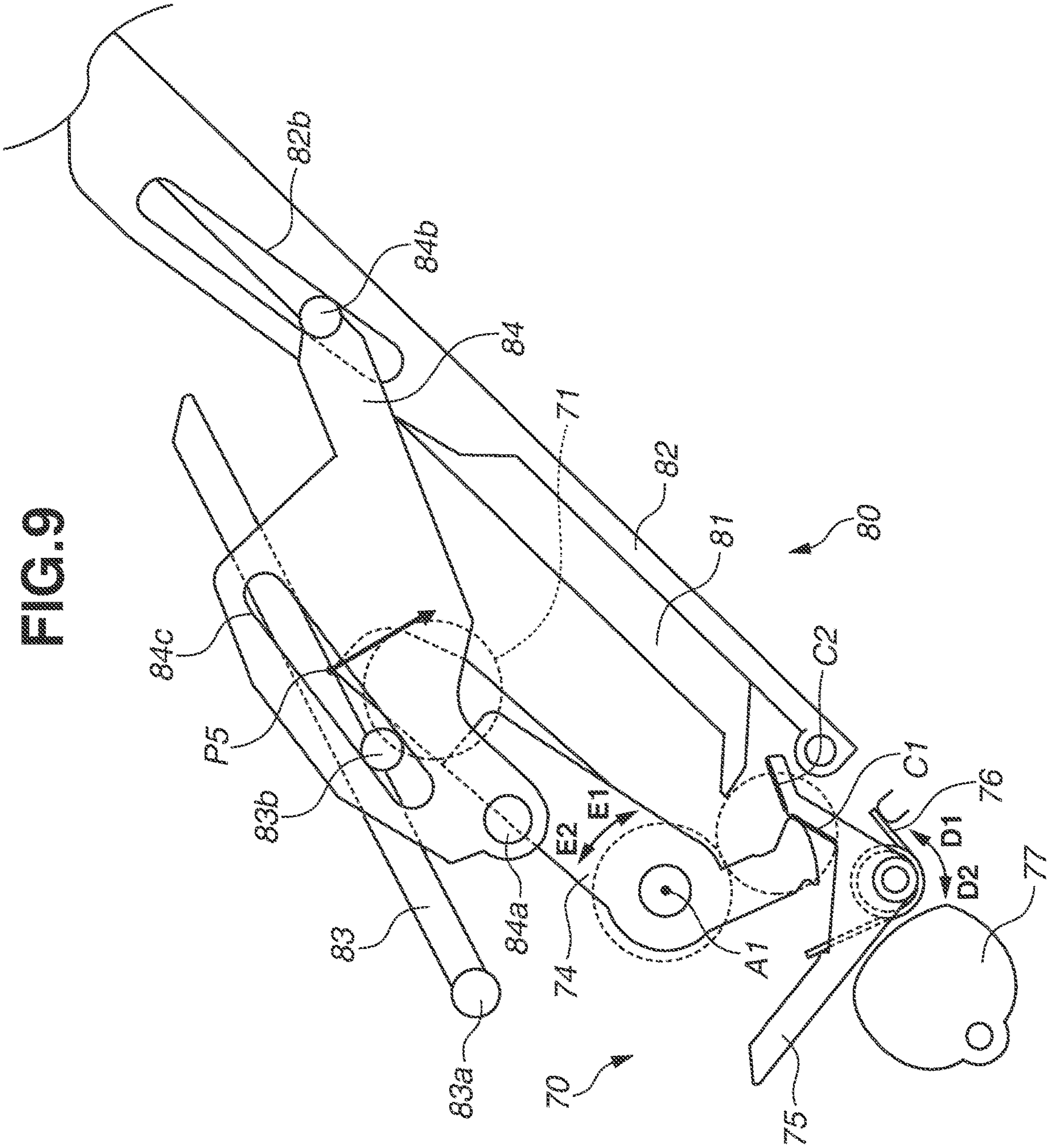
FIG. 9 is a diagram illustrating a state in which the door unit according to the exemplary embodiment is on the way moving from the stowed position to the opened position.

In the following description, an operation in fully opening the door unit 80 is described. The cover member 83 is configured to, when moving from the second position to the first position, push the swinging arm 74 in such a manner that the swinging arm 74 moves in the direction E1. The process of a fully opening operation for the door unit 80 is illustrated in FIG. 9. When the user pushes down the door unit 80 from the stowed position illustrated in FIG. 8, the cover member 83 also turns downward in conjunction with the door unit 80 via the door link 84. Then, the cover member 83 comes into contact with the swinging arm 74 at a point P5, so that the swinging arm 74 turns in the direction E1 around the axis A1. As mentioned above, in a state in which the door unit 80 is in the stowed position, the swinging arm 74 comes into contact with the second surface C2 of the pressure lever 75, so that the swinging arm 74 is urged in the direction E2 by the urging force of the pressure spring 76. Accordingly, the swinging arm 74 is pressed by the cover member 83 and thus begins to swing in the direction E1 against the urging force in the direction E2 of the pressure spring 76. In this way, the door link 84 and the cover member 83 function as an interlocking mechanism which causes the swinging arm 74 to swing in the direction E1 in conjunction with the fully opening operation for the door unit 80.

When the swinging arm 74 swings by a predetermined amount, as illustrated in FIG. 9, the position of contact between the swinging arm 74 and the pressure lever 75 changes from the second surface C2 to the first surface C1. When the swinging arm 74 and the pressure lever 75 come into contact with each other at the first surface C1, the swinging arm 74 turns in the direction E1 to move away from the cover member 83 and the pressure lever 75 turns in the direction D1 to come into abutting contact with the cam 77. Then, the swinging arm 74 moves to the separation position, so that the sheet feeding device 70 returns to the state illustrated in FIG. 6. In a state in which the swinging arm 74 is in abutting contact with the first surface C1 of the pressure lever 75, the urging force of the pressure spring 76 acts as a force which causes the swinging arm 74 to turn in the direction E1. Accordingly, in response to the door unit 80 being opened to the fully-opened position, as described above with reference to FIG. 3 and FIG. 4, the sheet feeding device 70 enters into a state in which, in association with rotation of the cam 77, the swinging arm 74 is able to perform a sheet feeding operation for causing the pickup roller 71 to ascend and descend.

Furthermore, the cover member 83 and the swinging arm 74 are configured not to come into contact with each other in a state in which the door unit 80 is in the fully-opened position, even if the swinging arm 74 ascends and descends (see FIG. 6).

Therefore, even if the swinging arm 74 ascends and descends during sheet feeding, no collision sound occurs between the swinging arm 74 and the cover member 83. Moreover, in the process of moving the door unit 80 from the fully-opened position to the stowed position, the cover member 83 does not act on the swinging arm 74.

Advantages to Present Exemplary Embodiment

Figure 10A:
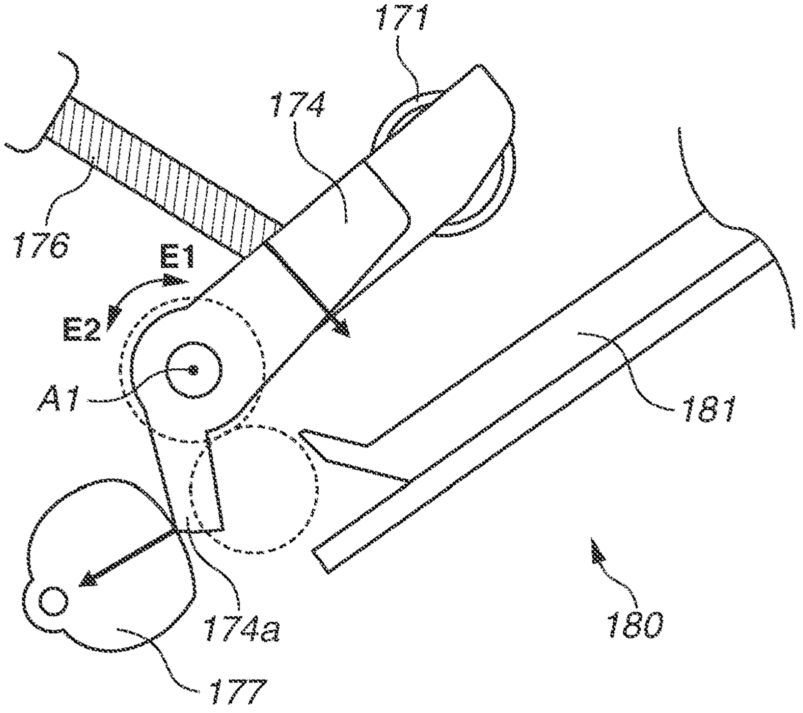
FIGS. 10A and 10B are diagrams illustrating a configuration of a sheet feeding device according to a comparative example.
Figure 10B:
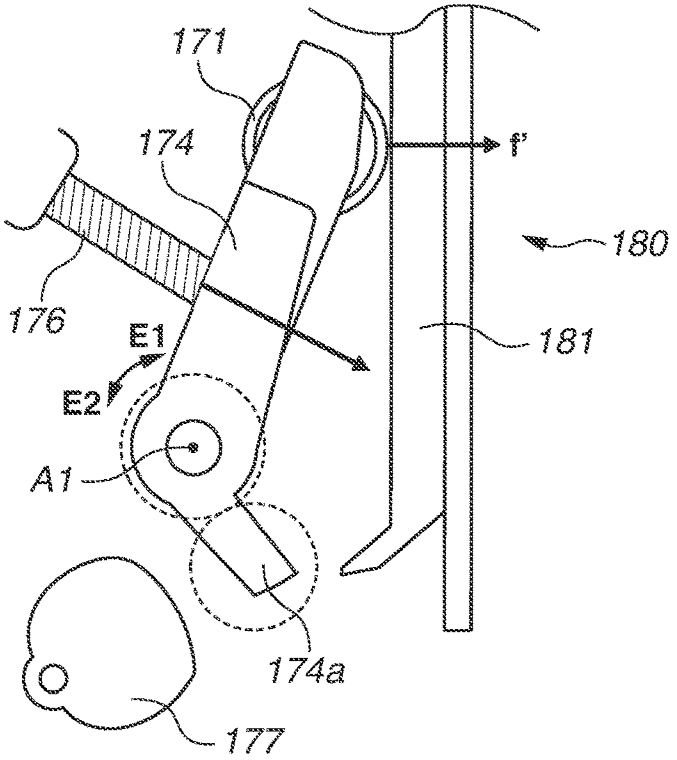

Advantages to the present exemplary embodiment are described while being compared with a comparative example illustrated in FIGS. 10A and 10B. The comparative example differs from the present exemplary embodiment in that a swinging arm 174 is directly urged by a pressure spring 176. Thus, as illustrated in FIG. 10A, the pressure spring 176 is directly connected to the swinging arm 174, and applies an urging force in the direction E1 around the axis A1 to the swinging arm 174. In a case where a door unit 180 is in the fully-opened position and a sheet feeding operation is not being performed, a projection portion 174*a* of the swinging arm 174 comes into abutting contact with a cam 177 and the urging force of the pressure spring 176 is received and stopped by the cam 177, so that the swinging arm 174 is held in the separation position.

When the user is raising the door unit 180 from the fully-opened position to the stowed position, as illustrated in FIG. 10B, a stacking tray 181 of the door unit 180 comes into abutting contact with a pickup roller 171, so that the swinging arm 174 swigs in the direction E2. At this time, the deformation amount of the pressure spring 176 becomes larger in association with swinging in the direction E2 of the swinging arm 174, so that the abutting contact pressure between the pickup roller 171 and the stacking tray 181 becomes larger. As a result, a force f' for pressing the door unit 180 in the fully-opening direction, which is applied from the swinging arm 174 to the door unit 180, reaches the maximum value in a state in which the door unit 180 is in the stowed position.

Such a force f' may cause creep deformation occurring in component members of the door unit 180 in a state in which the door unit 180 is stowed in the stowed position. Usually, in a packing state at the time of product transfer, since the door unit 180 is set in the stowed position in such a manner that the outer shape of the image forming apparatus 1 becomes the smallest, there is a concern that creep deformation occurs in the packing state. Moreover, if, in addition to the above-mentioned force f', the image forming apparatus 1 is placed in a hot environment for a long time, creep deformation becomes likely to occur.

Usually, an opening and closing unit such as the door unit 180 is often lower in rigidity. This is because, while a member high in strength is often used as a frame of the apparatus body 1A, a door unit which is an openable and closable structure often has restrictions in the material or size of a member to be used, from the viewpoint of, for example, a reduction in size and weight. Therefore, if, in the above-mentioned comparative example, the door unit 180 is formed from a member high in strength in such a way as to prevent deformation of the door unit 180, an increase in cost or an increase in size of the image forming apparatus may be incurred.

On the other hand, in the present exemplary embodiment, as mentioned above, in the process of the door unit 80 moving from the fully-opened position to the stowed position, the contact position between the pressure lever 75 and the swinging arm 74 changes. Then, a force which the door unit 80 receives from the swinging arm 74 in a state in which the door unit 80 is in the stowed position is smaller than the maximum value of the force f which the door unit 80 receives from the swinging arm 74 in the process of the stowing operation for the door unit 80. This enables preventing or reducing the occurrence of a deformation of the door unit 80, for which high rigidity is difficult to secure as compared with the apparatus body 1A. Additionally, this enables preventing or reducing the door unit 80 from being opened by a force received from the moving unit.

Moreover, in the present exemplary embodiment, a configuration in which, in a state in which the door unit 80 is in the stowed position, the urging force of the pressure spring 76, which is transmitted to the swinging arm 74 via the pressure lever 75, is received and stopped by the stopper 102 (FIG. 8) provided in the apparatus body 1A is employed. The urging force of the pressure spring 76 being received and stopped by such a configuration at the apparatus body side, for which high rigidity is easy to ensure, enables preventing or reducing creep deformation of the door unit 80 from occurring due to the urging force of the pressure spring 76 in, for example, a packing state.

Moreover, in the present exemplary embodiment, a configuration in which, in a case where the door unit 80 moves from the stowed position to the fully-opened position, the swinging arm 74 is caused to move to the separation position by the cover member 83, which operates in conjunction with the door unit 80, is employed. In most cases, unlike a sheet feeding device of the stowable tray type, a sheet feeding device of the manual feed tray type is arranged at a position projecting outside from the image forming apparatus body. Therefore, an ascending and descending operation of the swinging arm 74 performed during sheet feeding is easily viewable by the user, and the swinging arm 74 may be inadvertently touched by the user. The cover member 83 in the present exemplary embodiment being arranged to cover the swinging arm 74 and the pickup roller 71 from above enables, in addition to the above-mentioned action, making an ascending and descending operation of the swinging arm 74 performed during sheet feeding unlikely to be viewable and reducing an inadvertent touch by the user.

Modification Examples

Furthermore, in the present exemplary embodiment, in a state in which the door unit 80 is in the stowed position, the swinging arm 74 is urged by the pressure spring 76 not in the direction E1 but in the direction E2, and the door unit 80 receives no force from the swinging arm 74 (the force which the door unit 80 receives from the swinging arm 74 is zero). However, as long as the force which the door unit 80 receives from the swinging arm 74 in a state in which the door unit 80 is in the stowed position is smaller than the maximum value of the force f which the door unit 80 receives from the swinging arm 74 in the process of the stowing operation for the door unit 80, a different configuration can be employed. Thus, even if the door unit 80 is in the stowed position and the pickup roller 71 is in the state of being in abutting contact with the door unit 80, the urging force of the pickup roller 71 only needs to be sufficiently smaller than the maximum value of the force f. For example, a configuration in which, in a state in which the door unit 80 is in the stowed position, the pressure lever 75 urges the swinging arm 74 in the direction E1 by the urging force of the pressure spring 76 can be employed as long as the urging force of the swinging arm 74 is sufficiently smaller than the maximum value of the force f.

Furthermore, a configuration in which, in a state in which the door unit 80 is in the stowed position, the pickup roller 71 or the swinging arm 74 is caused to come into abutting contact with the cover member 83 to urge the cover member 83 in a direction to close the door unit 80 can be employed. At that time, it is favorable to employ a configuration in which a part of the apparatus body 1A and the cover member 83 are caused to come into abutting contact with each other and the cover member 83 is received and stopped by the apparatus body 1A. This configuration enables preventing or reducing the door unit 80 from being opened by a force received from the moving unit. At this time, it is favorable that the urging force which the cover member 83 receives is smaller than the maximum value of the force f which the door unit 80 receives from the swinging arm 74 in the process of the stowing operation for the door unit 80.

Moreover, the pressure spring 76 to be used as an urging portion can be, besides a torsion coil spring, for example, a tension spring, a compressed spring, or a plate spring in such a way as to generate a force similar to the force generated by the pressure spring 76. Moreover, the urging portion can be formed integrally with the pressure lever 75. For example, a plate spring formed integrally with the pressure lever 75 can be used as the urging portion.

Moreover, while, in the present exemplary embodiment, a configuration in which, in a state in which the door unit 80 is in the stowed position, the urging force of the pressure spring 76 is received and stopped by the stopper 102 (FIG. 8) has been described, the urging force of the pressure spring 76 can be received and stopped with use of the cam 77. Thus, in a case where the stopper 102 is omitted, the pressure lever 75 slightly turns in the direction D1 from the position illustrated in FIG. 8 and comes into abutting contact with the cam 77. In this state, sine the urging force with which the pressure lever 75 is urged in the direction D1 by the pressure spring 76 is received and stopped by the cam 77, the urging force of the pressure spring 76 is not transmitted to the swinging arm 74.

Moreover, while, in the present exemplary embodiment, the stacking tray 81 has a structure integral with the door member 82, the stacking tray 81 can be configured to be movable with respect to a frame of the opening and closing unit such as the door member 82.

Moreover, a member which pushes up the swinging arm 74 when the door unit 80 is moved from the fully-opened position to the stowed position is not limited to the stacking tray 81, and a part of the door unit 80 (for example, the door member 82) can push up the swinging arm 74. Moreover, in the present exemplary embodiment, a configuration in which a part of the door unit 80 comes into abutting contact with the pickup roller 71 to push up the swinging arm 74 is employed. The present exemplary embodiment is not limited to this, and a part of the door unit 80 can come into abutting contact with the swinging arm 74 or a member integral with the swinging arm 74 to push up the swinging arm 74.

Moreover, while, in the present exemplary embodiment, a configuration in which, in a case where the door unit 80 moves from the stowed position to the fully-opened position, the swinging arm 74 operates in conjunction with the door unit 80 by a mechanism including the door link 84 and the cover member 83 is employed, a different interlocking configuration can be employed. For example, a configuration in which the swinging arm 74 is coupled to one end of a link member and the other end of the link member is coupled to the door unit 80, so that the swinging arm 74 operates in conjunction with an opening operation of the door unit 80, can be employed.

According to aspects of the present disclosures, it is possible to prevent or reduce a feeding roller or a moving member from being touched from the outside.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-179312 filed Oct. 27, 2020 and No. 2021-076248 filed Apr. 28, 2021, which are hereby incorporated by reference herein in their entirety.

What is claimed is:

1. A sheet feeding device comprising:

a door openable and closable between an opened position and a closed position with respect to an apparatus body;

a stacking portion on which to stack a sheet;

a cover portion configured to face the door and move with respect to the apparatus body in conjunction with an opening and closing operation of the door, wherein the cover portion is situated at a first position when the door is situated at the opened position and is situated at a second position when the door is situated at the closed position;

a moving unit including (i) a feeding roller configured to feed the sheet and (ii) a moving member supporting the feeding roller and including a contacted portion, wherein the moving member is movable with respect to the stacking portion in a first direction in which the feeding roller comes close to the stacking portion and in a second direction which is opposite to the first direction;

a spring; and a transmission portion including a first contact portion, wherein, in a state in which the cover portion is situated at the first position, the moving unit is situated between the cover portion and the door, wherein, when the cover portion moves from the second position to the first position, the cover portion pushes the moving unit in such a manner that the moving member moves in the first direction, and wherein, in a state in which the door is in the closed position, the transmission portion is urged by the spring and the first contact portion contacts the contacted portion so that the moving member is urged in the second direction by the spring.

2. The sheet feeding device according to claim 1, wherein, as viewed along a vertical direction, the cover portion situated at the first position and the feeding roller overlap each other.

3. The sheet feeding device according to claim 1, wherein the door is configured to swing around a first axis with respect to the apparatus body, and the cover portion is configured to swing around a second axis with respect to the apparatus body.

4. The sheet feeding device according to claim 3, wherein an angle at which the cover portion moves from the second position to the first position is larger than an angle at which the door moves from the closed position to the opened position.

5. The sheet feeding device according to claim 1, further comprising a link member configured to interlink the cover portion and the door in such a manner that the cover portion moves with respect to the apparatus body in conjunction with the opening and closing operation of the door.

6. The sheet feeding device according to claim 1, wherein, in the state in which the cover portion is situated at the first position, the cover portion is away from the moving member.

7. The sheet feeding device according to claim 1, wherein, in the state in which the door is in the closed position, the moving member is received and stopped by the apparatus body.

8. The sheet feeding device according to claim 1, further comprising a cam configured to move between a regulation position where the cam comes into abutting contact with the transmission portion to regulate the transmission portion and a release position where the cam retreats from the regulation position, wherein, in a state in which the door is in the opened position and the cam is in the release position, the moving member is urged in the first direction by the spring.

9. The sheet feeding device according to claim 1, wherein, when the cover portion is in the second position, the cover portion is away from the feeding roller.

10. The sheet feeding device according to claim 1, wherein the moving member is configured to be swingable with respect to the stacking portion in the first direction and the second direction.

11. The sheet feeding device according to claim 1, wherein the moving member is moved in the second direction in response to the stacking portion coming into abutting contact with the feeding roller in association with an operation which the door performs to move from the opened position to the closed position.

12. The sheet feeding device according to claim 1, wherein, in a state in which the door is in the opened position, the stacking portion is exposed outside, and, in athe state in which the door is in the closed position, the stacking portion is stowed in between the door and the apparatus body.

13. The sheet feeding device according to claim 1, wherein the stacking portion is supported by the door.

14. The sheet feeding device according to claim 1, wherein the cover portion is configured to turn with respect to the apparatus body, and includes a base portion in which a supported portion which is supported by the apparatus body is arranged and a fore-end portion arranged opposite to the base portion with respect to a direction perpendicular to a turning axis direction of the cover portion.

15. The sheet feeding device according to claim 14, wherein a length from the base portion to the fore-end portion at a middle portion as viewed in the turning axis direction is longer than a length from the base portion to the fore-end portion at each of both end portions as viewed in the turning axis direction.

16. The sheet feeding device according to claim 14, wherein, in the state in which the cover portion is situated at the first position, the fore-end portion is higher in position than a position of the based portion.

17. The sheet feeding device according to claim 14, wherein, the transmission portion includes a second contact portion, and is rotatable about a pivot axis and is urged by the spring toward a predetermined rotation direction, wherein, in a case where the first contact portion contacts the contacted portion and the transmission portion rotates the predetermined rotation direction, the moving member is moved toward the second direction, wherein, in a case where the second contact portion contacts the contacted portion and the transmission portion rotates the predetermined rotation direction, the moving member is moved toward the first direction.

18. An image forming apparatus comprising:

the sheet feeding device according to claim 1; and an image forming unit configured to form an image on a sheet fed from the sheet feeding device.

19. A sheet feeding device comprising:

a door openable and closable between an opened position and a closed position with respect to an apparatus body;

a stacking portion on which to stack a sheet;

a cover portion configured to face the door and move with respect to the apparatus body in conjunction with an opening and closing operation of the door, wherein the cover portion is situated at a first position when the door is situated at the opened position and is situated at a second position when the door is situated at the closed position; and a moving unit including (i) a feeding roller configured to feed the sheet and (ii) a moving member supporting the feeding roller, wherein the moving member is movable with respect to the stacking portion in a first direction in which the feeding roller comes close to the stacking portion and in a second direction which is opposite to the first direction, wherein, in a state in which the cover portion is situated at the first position, the moving unit is situated between the cover portion and the door, wherein, when the cover portion moves from the second position to the first position, the cover portion pushes the moving unit in such a manner that the moving member moves in the first direction, wherein the cover portion is configured to turn with respect to the apparatus body, and includes a base portion in which a supported portion which is supported by the apparatus body is arranged and a fore-end portion arranged opposite to the base portion with respect to a direction perpendicular to a turning axis direction of the cover portion, and wherein, in the state in which the cover portion is situated at the first position, the fore-end portion is higher in position than a position of the based portion.

20. The sheet feeding device according to claim 19, wherein, as viewed along a vertical direction, the cover portion situated at the first position and the feeding roller overlap each other.

21. The sheet feeding device according to claim 19, wherein the door is configured to swing around a first axis with respect to the apparatus body, and wherein the cover portion is configured to swing around a second axis with respect to the apparatus body.

22. The sheet feeding device according to claim 21, wherein an angle at which the cover portion moves from the second position to the first position is larger than an angle at which the door moves from the closed position to the opened position.

23. The sheet feeding device according to claim 19, further comprising a link member configured to interlink the cover portion and the door in such a manner that the cover portion moves with respect to the apparatus body in conjunction with the opening and closing operation of the door.

24. The sheet feeding device according to claim 19, wherein, in the state in which the cover portion is situated at the first position, the cover portion is away from the moving member.

25. The sheet feeding device according to claim 19, wherein, when the cover portion is in the second position, the cover portion is away from the feeding roller.

26. The sheet feeding device according to claim 19, wherein the moving member is configured to be swingable with respect to the stacking portion in the first direction and the second direction.

27. The sheet feeding device according to claim 19, wherein the moving member is moved in the second direction in response to the stacking portion coming into abutting contact with the feeding roller in association with an operation which the door performs to move from the opened position to the closed position.

28. The sheet feeding device according to claim 19, wherein, in a state in which the door is in the opened position, the stacking portion is exposed outside, and, in a state in which the door is in the closed position, the stacking portion is stowed in between the door and the apparatus body.

29. The sheet feeding device according to claim 19, wherein the stacking portion is supported by the door.

30. The sheet feeding device according to claim 19, wherein a length from the base portion to the fore-end portion at a middle portion as viewed in the turning axis direction is longer than a length from the base portion to the fore-end portion at each of both end portions as viewed in the turning axis direction.

31. An image forming apparatus comprising:

the sheet feeding device according to claim 19; and an image forming unit configured to form an image on a sheet fed from the sheet feeding device.

* * * * *